United States Patent [19]

Howard

[11] Patent Number: 4,930,812

[45] Date of Patent: Jun. 5, 1990

[54] ADHESIVE LABLE OR LEAFLET ASSEMBLIES

[75] Inventor: Robin G. Howard, Suffolk, England

[73] Assignee: Denny Bros. Printing Limited, Suffolk, United Kingdom

[21] Appl. No.: 237,076

[22] Filed: Aug. 15, 1988

[30] Foreign Application Priority Data

Aug. 12, 1987 [GB] United Kingdom ................ 8718217

[51] Int. Cl.[5] ...................... B42D 19/00; B42D 15/00; B41L 1/20; B32B 31/00

[52] U.S. Cl. .................................. 281/5; 282/11.5A; 283/81; 156/253

[58] Field of Search ..................... 281/1, 2, 5; 283/25, 283/51, 60, 61, 81, 100, 105, 8.1; 156/227, 253, 268, 270; 40/306, 625; 282/11.5 A, 11.5 R, 16 C, 11.8 A; 229/69, 70; 488/40

[56] References Cited

U.S. PATENT DOCUMENTS

| | | | |
|---|---|---|---|
| 3,674,614 | 7/1972 | Templeton | 283/81 |
| 4,166,144 | 8/1979 | Amberker | 283/81 |
| 4,318,235 | 3/1982 | Augeri | 283/81 |
| 4,529,229 | 7/1985 | Glibbery | 283/81 |
| 4,675,062 | 6/1987 | Instance | 156/253 |
| 4,711,686 | 12/1987 | Instance | 282/11.5 A |
| 4,744,591 | 5/1988 | Instance | 283/81 |
| 4,747,618 | 5/1988 | Instance | 281/5 |

*Primary Examiner*—Douglas D. Watts
*Assistant Examiner*—Paul M. Heyrana
*Attorney, Agent, or Firm*—Wenderoth, Lind & Ponack

[57] ABSTRACT

An adhesive label or leaflet assembly comprises a flexible carrier strip 10 with a series of labels or leaflets spaced along its length and each secured thereto by an adhesive strip 21. The face of the carrier strip 10 on which the labels or leaflets are disposed is coated with a release material, and the adhesive strip adheres to the front sheet 14 of the label or leaflet and has bands 23 extending lengthwise of the carrier strip beyond the ends of each label or leaflet and adhering to the release material. Each label or leaflet comprises a back sheet 15, a front sheet 14 and one or more further sheets 17, 19 all connected together along fold lines 16, 18, 20, the further sheets being disposed between the front and back sheets. The labels or leaflets in the resulting assembly can readily be dispensed on to a succession of containers by automatic machinery, the bands 23 then serving to secure the labels or leaflets to the containers.

8 Claims, 3 Drawing Sheets

ADHESIVE LABLE OR LEAFLET ASSEMBLIES

Figure 1:
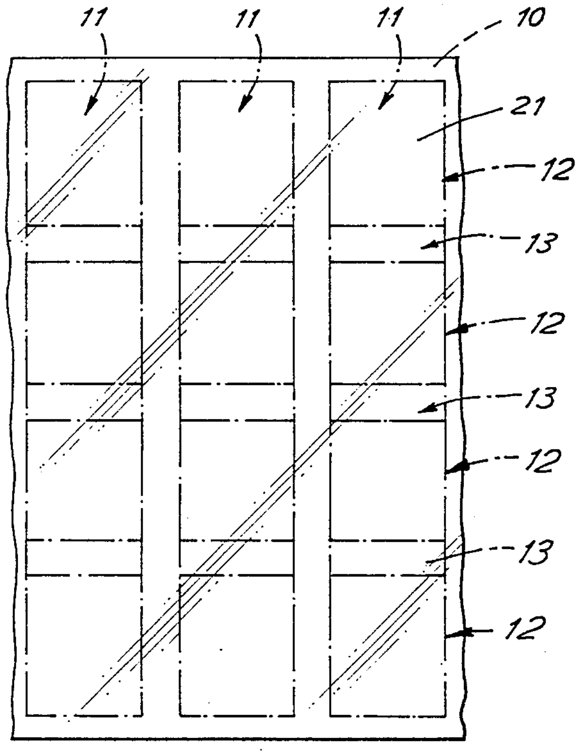

This invention relates to adhesive label or leaflet assemblies and is concerned with the provision of an assembly whereby individual labels or leaflets can be detached from a carrier strip and attached by automatic machines to individual articles. The strip with its charge of labels or leaflets is conveniently adapted for storing in a roll.

According to this invention there is provided an adhesive label or leaflet assembly comprising a flexible carrier strip having one of its faces coated with a release material, and a plurality of labels or leaflets spaced from each other lengthwise of the coated face of the strip each of said labels or leaflets comprising a front sheet, a back sheet connected by an edge thereof to the front sheet along a first line, and one or more further sheets disposed between the front and back sheets and connected to the back sheet along a second line, each label or leaflet being individually secured to said coated face by adhesive sheet means covering and adherent to the front sheet and to transverse bands of the carrier strip immediately adjoining the transverse edges of the label or leaflet, and the edge of the back sheet opposite said one edge being tacked to the adhesive sheet means or to the rear face of the front sheet, and the lengthwise margins of the carrier strip extending laterally beyond the labels or leaflets and the adhesive sheet means.

Preferably said first line along which the front and back lines are connected together is a fold line.

Preferably also said second line along which the further sheets are connected to the back sheet is a fold line. In preferred constructions the first and second fold lines are parallel and extend at right angles to the lengthwise dimension of the carrier strip.

The adhesive sheet means may extend beyond the lengthwise extending edges of the label or leaflet to engage said coated face of the strip.

The adhesive sheet may be translucent or opaque but is preferably transparent.

Said opposite edge of the back sheet may be adhesively tacked indirectly to the adhesive sheet means by positioning the second fold line beyond the free edge of the front sheet, or by cutting away parts of the free edge of the front sheet, e.g. at its corners, or by forming one or more holes in the front sheet adjacent its free edge so that the part or parts of said further sheet behind the hole or holes can adhere to the adhesive sheet means.

The invention also provides a method of forming an adhesive label or leaflet assembly comprising the steps of placing at spaced intervals along a flexible carrier strip a plurality of labels or leaflets, the face of the strip on which the labels or leaflets are placed being coated with a release material, each of said labels or leaflets comprising a front sheet, a back sheet connected to the front sheet along a first fold line, one or more further sheets connected to the back sheet and disposed .between the front and back sheets, placing over the carrier strip and the labels or leaflets an adhesive strip of translucent or transparent sheet material so as to cover the whole of each label or leaflet and to adhere to the front sheet of each label or leaflet, and die-cutting through everything but the carrier strip about each label or leaflet so as to leave each label or leaflet secured to the carrier strip by transversely extending bands of the adhesive strip respectively adjoining the transversely extending edges of the label or leaflet and removing the excess adhesive strip, leaving the lengthwise extending margins of the carrier strip devoid of covering.

The terms "transversely" "transverse" and "longitudinally" are used herein to specify directions in relation to the carrier strip.

Figure 2:
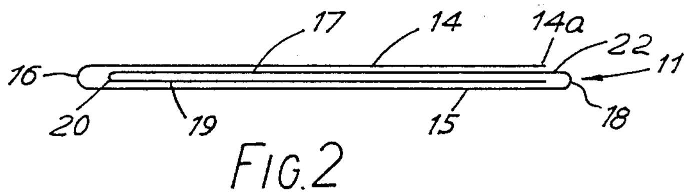
Figure 5:
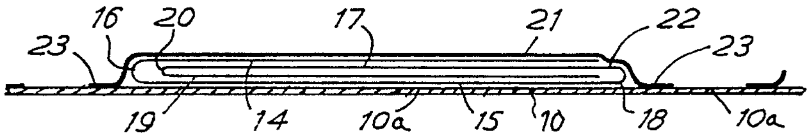
Figure 3:
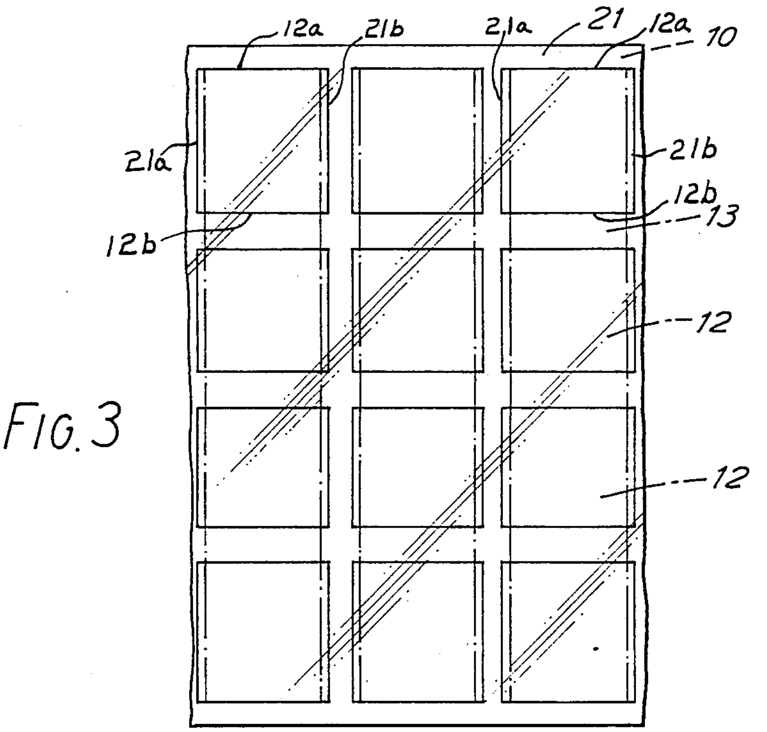
Figure 4:
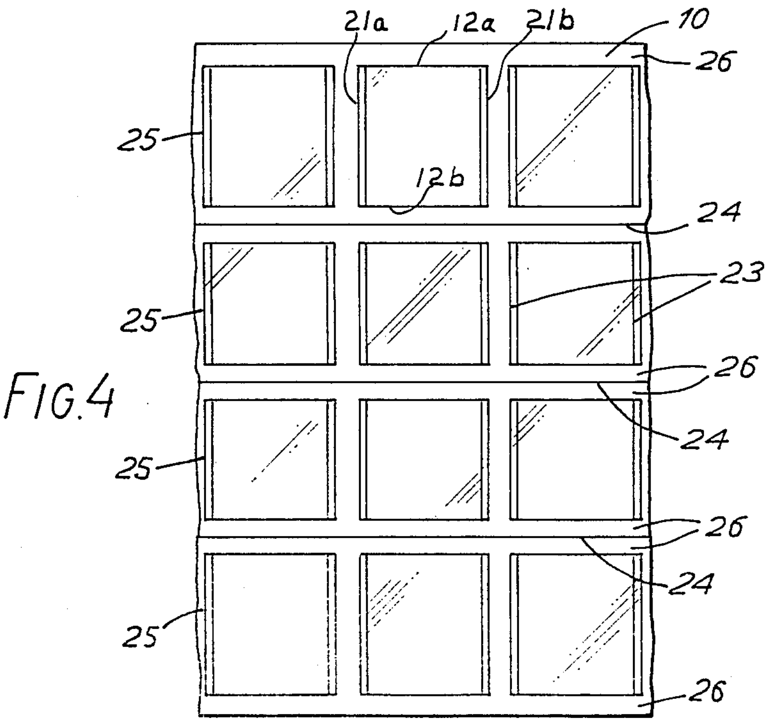
Figure 6:
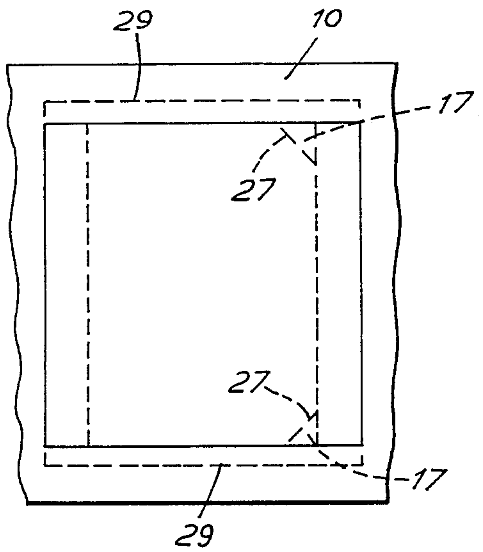
Figure 7:
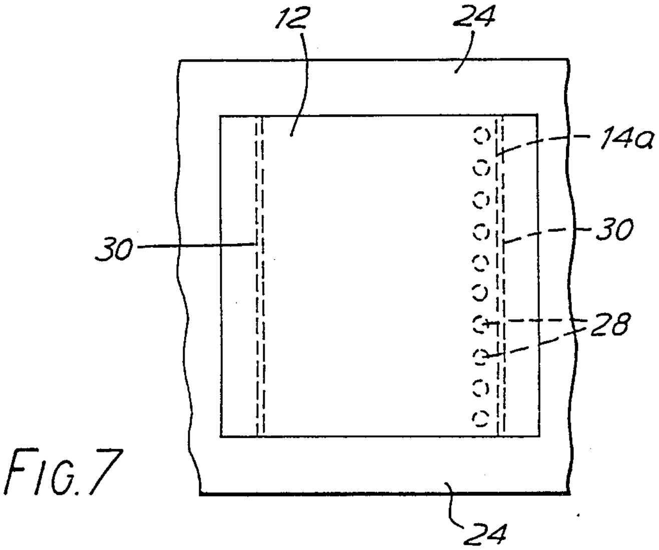

Some embodiments of the invention will now be described by way of example with reference to the accompanying diagrammatic drawings in which:

FIG. 1 shows the first stage in one method of manufacturing leaflets according to the invention, FIG. 2 is an edgewise view of a strip of the leaflets on an enlarged scale, FIGS. 3 and 4 show two further stages in the method FIG. 5 is an edgewise view of the leaflets on the carrier web on an enlarged scale, and FIGS. 6 and 7 illustrate modifications of the method.

Referring now to FIG. 1 of the drawings, a carrier web 10 of paper having a release coating 10*a* on its upper surface has placed on it a series of strips 11 of leaflets, each strip extending transversely of the web but terminating short of the side edges of the web, and being spaced lengthwise of the web from the next adjacent strips. Each strip comprises four leaflets 12 and three intermediate bands or portions 13 which may be blank. Portions 13 serve to connect the leaflets 12 and intermediate portions 13 12 together at this stage for ease of handling but which are eventually to be discarded.

Each strip of leaflets is in one piece and is of uniform section along its length. The strip comprises, as shown viewed edgewise transversely of the web 10 in FIG. 2, a front sheet 14, a back sheet 15 slightly longer than the front sheet and connected to the front sheet along a transverse fold line 16, first further sheet 17 connected to the back sheet 15 along a fold line 18, and a second further sheet 19 connected to the further sheet 17 along a fold line 20. Sheets 17 and 19 are disposed between the front and back sheets. Each leaflet may incorporate, in addition to matter identifying the article to which it is to be attached, instructions for use of the article, maker's guarantee, or other matter.

A transparent web 21 with adhesive on its rear or underneath face is placed lengthwise over the carrier web 10 and the strips of leaflets 12, so that the front sheets 14 of the strips of leaflets and the exposed surface portions of the carrier web 10 adhere to it. Since the back sheet 15 is slightly longer than the front sheet 14 a narrow margin 22 of the sheet 17 projects beyond the free edge 14*a* of the front sheet 14 and becomes lightly tacked to the adhesive rear face of the transparent web 21. The assembly is thus as shown in FIG. 3 of the drawings.

This assembly of the carrier web 10, strips 11 and transparent web 20 is now subjected to a die-cutting operation in which the strip and transparent web 30, but not the carrier web 10, are cut along lines shown at 12*a*, 12*b*, 21*a*, and 21*b* in FIG. 3 about each and every leaflet 12. In the result each strip is divided into its four constituent leaflets and separates the bands or intermediate portions 13 from the leaflets 12, leaving each leaflet attached to the carrier web by two strips 23 of the transparent web extending beyond the fold lines 16, 18 of the leaflet. The transparent web 21 is then pull away from the carrier web, taking with it the portions 13, but leaving a rectangle of the web material over each leaflet, and is discarded. In other words, the portions of transparent web 21, between leaflets 12 and covering and adhering to portions 13, are removed along with portions 13 stuck thereto. The carrier web 10 carrying its rows of four leaflets is then slit lengthwise along the lines 24 shown in FIG. 4 into four strips 25 each carrying a succession of leaflets leaving exposed two lengthwise margins 26 of the strip of web 10 material at opposite sides of the leaflets. FIG. 5 shows the resulting arrangement viewed at right angles to the length of the web 10.

Each strip 25 with its leaflets 12 adherent thereto is intended to be rolled up for storage purposes. When the assembly comes to be used, the strip is led round a guide presenting a relatively small radius guide surface to the rear (uncoated) face of the strip 10 and the relative stiffness of sub-assembly of the leaflet 12 and transparent sheet material causes the sub-assembly to become parted from the strip so that the adhesive rear face of the leading edge portion 23 of the panel of transparent sheet material covering the leaflet is exposed. Simultaneously the article to which the subassembly is to be applied is moved past the guide at a matching speed to that of the strip 25 and a transfer device causes the sub-assembly to be transferred to the article as it peels from the strip.

The strip of labels or leaflets is advantageous in being well adapted for use in this way with automatic machines. The lengthwise margins or selvedges of the carrier strip, being devoid of any covering, are particularly suitable for use in such machines because the web or strip guides of the machines use the selvedge and can be snagged by a thick edge of a label or leaflet. The method of manufacture of the label or leaflet assemblies is advantageous in that the label or leaflet can be of any shape and its edges which extend lengthwise of the carrier strip need not be straight.

The light tacking of the sheet 17 to the adhesive rear face of the transparent panel prevents the leaflet from opening during the transparent. Referring now to FIG. 6, the further sheet 17 can alternatively be arranged to become tacked to the adhesive face of the transparent sheet by cutting off the corners of the free edge of the front sheet as shown at 27 or, as shown in FIG. 7, by forming holes 28 adjacent the free edge of the front sheet 14 so that the parts of the further sheet 17 so exposed become pressed against and adherent to the said adhesive face. In another alternative arrangement (not shown) the front face of the further sheet may be tacked to the rear face of the front sheet by a transversely extending line of adhesive.

In the arrangements illustrated the transparent sheet has the same width as the leaflet, but if desired, for example for weather resistant purposes, the transparent sheet may have a width greater than the label, as indicated in chain lines at 29 in FIG. 6.

If desired a line of perforations 30 may extend widthwise of the transparent sheet on either or both sides of the leaflet as shown in FIG. 7 to facilitate access to the label or leaflet by the consumer.

I claim:

1. An adhesive label or leaflet assembly comprising a flexible carrier strip having one of its faces coated with a release material, and a plurality of labels or leaflets spaced from each other lengthwise of the coated face of the strip each of said labels or leaflets comprising a front sheet, a back sheet connected by one transverse edge thereof to the front sheet along a first fold line, and one or more further sheets disposed between the front and back sheets and connected to the back sheet along a second fold line, each label or leaflet being individually secured to said coated face by adhesive sheet means covering and adherent to the front sheet and to transverse bands of the carrier strip immediately adjoining the transverse edges of the label or leaflet, and the transverse edge portion of the back sheet opposite said one transverse edge being tacked to the adhesive sheet means, and the lengthwise margins of the carrier strip extending laterally beyond the labels or leaflets and the adhesive sheet means.

2. An assembly as claimed in claim 1, wherein the first and second fold lines are parallel and extend at right angles to the lengthwise dimension of the carrier strip.

3. An assembly as claimed in claim 2, wherein said opposite edge of the back sheet is adhesively tacked indirectly to the adhesive sheet means by positioning the second fold line beyond the free edge of the front sheet.

4. An assembly as claimed in claim 2, wherein said opposite edge of the back sheet is adhesively tacked indirectly to the adhesive sheet means by cutting away parts of the free edge of the front sheet.

5. An assembly as claimed in claim 2, wherein said opposite edge of the back sheet is adhesively tacked indirectly to the adhesive sheet means by forming one or more holes in the front sheet adjacent its free edge so that the part or parts of said further sheet behind the hole or holes can adhere to the adhesive sheet means.

6. A method of forming an adhesive label or leaflet assembly comprising the steps of placing at spaced intervals along a flexible carrier strip a plurality of labels or leaflets, the face of the strip on which the labels or leaflets are placed being coated with a release material, each of said labels or leaflets comprising a front sheet, a back sheet connected to the front sheet along a first fold line, one or more further sheets connected to the back sheet and disposed between the front and back sheets, placing over the carrier strip and the labels or leaflets an adhesive strip of translucent or transparent sheet material so as to cover the whole of each label or leaflet and to adhere to the front sheet of each label or leaflet, and die-cutting through said adhesive strip, said front sheet, said back sheet and said further sheets but not the carrier strip about each label or leaflet so as to leave each label or leaflet secured to the carrier strip by transversely extending bands of the adhesive strip respectively adjoining the transversely extending edges of the label or leaflet, and removing the adhesive strip except for said transversely extending bands of the adhesive strip, leaving the lengthwise extending margins of the carrier strip devoid of covering.

7. A method as claimed in claim 6, wherein strips of the labels or leaflets, formed integrally with each other with separating portions between each two next adjacent labels or leaflets, are placed to extend transversely of a carrier web and are covered by the adhesive strip, whereby after the die-cutting removal of the excess adhesive strip removes said separating portions, and comprising the further step of slitting the carrier web lengthwise centrally through the former location of the bands to form a plurality of carrier strips each carrying labels or leaflets secured thereto at spaced intervals along its length and having its lengthwise margins devoid of covering.

8. An adhesive label or leaflet assembly comprising a flexible carrier strip having one of its faces coated with a release material, and a plurality of labels or leaflets spaced from each other lengthwise of the coated face of the strip each of said labels or leaflets comprising a front sheet, a back sheet connected by one transverse edge thereof to the front sheet along a first fold line, and one or more further sheets disposed between the front and back sheets and connected to the back sheet along a second fold line, each label or leaflet being individually secured to said coated face by adhesive sheet means covering and adherent to the front sheet and to transverse bands of the carrier strip immediately adjoining the transverse edges of the label or leaflet, and the transverse edge portion of the back sheet opposite said one transverse edge being tacked to the rear face of the front sheet, and the lengthwise margins of the carrier strip extending laterally beyond the labels or leaflets and the adhesive sheet means.

* * * * *